United States Patent
Schroeder (10) Patent No.: US 8,070,361 B2
(45) Date of Patent: Dec. 6, 2011

(54) LINEAR RAIL SYSTEM HAVING PRELOAD ADJUSTMENT MECHANISM

(75) Inventor: Jonathan R. Schroeder, Roscoe, IL (US)

(73) Assignee: Pacific Bearing Company, Rockford, IL (US)

( * ) Notice: Subject to any disclaimer, the term of this patent is extended or adjusted under 35 U.S.C. 154(b) by 200 days.

(21) Appl. No.: 12/467,734

(22) Filed: May 18, 2009

(65) Prior Publication Data

US 2009/0285513 A1    Nov. 19, 2009

Related U.S. Application Data

(60) Provisional application No. 61/054,324, filed on May 19, 2008.

(51) Int. Cl.
*F16C 19/00*    (2006.01)

(52) U.S. Cl. ............................................. 384/57; 384/58

(58) Field of Classification Search .................. 384/10, 384/19, 24, 50, 53, 54, 55, 57, 58, 255, 447; 312/334.9, 334.12, 334.15, 334.18, 334.21, 312/334.25, 334.26, 334.33, 334.39, 334.41, 312/334.43; 411/393; 49/425; 16/91, 105, 16/106; 403/DIG. 11, DIG. 12, DIG. 13; 188/77 W, 82.6
See application file for complete search history.

(56) References Cited

U.S. PATENT DOCUMENTS

| | | |
|---|---|---|
| 755,607 A | 3/1904 | Bischoff |
| 1,375,536 A | 4/1921 | Ostrander |
| 1,537,067 A | 5/1925 | Card |
| 1,923,853 A | 8/1933 | Van Duyn |
| 1,926,828 A | 9/1933 | Van Berkel |
| 2,082,798 A | 6/1937 | Herold |
| 2,598,251 A | 5/1952 | Gesner |
| 3,019,072 A | 1/1962 | Bose et al. |
| 3,105,272 A * | 10/1963 | Tucker, Jr ...................... 49/411 |
| 3,287,759 A | 11/1966 | Foltz |
| 3,446,537 A | 5/1969 | Sutowski |
| 3,469,892 A | 9/1969 | Langstroth |
| 3,541,922 A | 11/1970 | Dunlap |
| 3,588,206 A * | 6/1971 | Frost ............................ 384/481 |
| 3,661,431 A * | 5/1972 | Wisecarver .................... 384/55 |
| 3,925,933 A | 12/1975 | Reuter |

(Continued)

FOREIGN PATENT DOCUMENTS

DE    42 16 900 A1    11/1992

(Continued)

*Primary Examiner* — Thomas R Hannon
*Assistant Examiner* — Adam D Rogers
(74) *Attorney, Agent, or Firm* — Reinhart Boerner Van Deuren P.C.

(57) ABSTRACT

A guide carriage assembly that permits adjustment of a relative position of a bearing device, typically a guide wheel, relative to a carriage body is provided. The guide carriage assembly includes a carriage body, at least one support shaft and a guide wheel mounted to the support shaft. The support shaft provides a locating axis about which the support shaft may rotate when mounted to the carriage body. The support shaft further defines an offset bearing axis about which the guide wheel rotates. The offset relationship between the bearing axis and locating axis permits adjustment of the relative position of the guide wheel, or support surface, and the carriage body by rotating the support shaft about the locating axis. The guide carriage assembly may further including locking structure that applies opposing torques about the locating axis to secure the support shaft, and consequently the guide wheel, in the desired location.

17 Claims, 7 Drawing Sheets

U.S. PATENT DOCUMENTS

| | | | |
|---|---|---|---|
| 4,109,343 A | 8/1978 | Weis et al. | |
| 4,390,216 A | 6/1983 | Mueller et al. | |
| 4,815,863 A | 3/1989 | Forster | |
| 4,958,943 A | 9/1990 | Nakanishi | |
| 5,054,342 A | 10/1991 | Swiatowy et al. | |
| 5,286,115 A * | 2/1994 | Toji et al. | 384/127 |
| 5,302,030 A | 4/1994 | Buie et al. | |
| 5,335,987 A | 8/1994 | Hodge et al. | |
| 5,368,399 A | 11/1994 | Tremblay | |
| 5,399,010 A | 3/1995 | McClung et al. | |
| 5,440,999 A | 8/1995 | Dallman et al. | |
| 5,470,159 A | 11/1995 | Hillmann | |
| 5,735,214 A * | 4/1998 | Tsuboi | 105/29.1 |
| 5,820,269 A | 10/1998 | Ariga | |
| 5,906,439 A * | 5/1999 | Lin | 384/53 |
| 6,148,569 A * | 11/2000 | Giovannetti | 52/127.11 |
| 6,149,308 A * | 11/2000 | Schroeder et al. | 384/50 |
| 6,450,687 B1 * | 9/2002 | Schroeder et al. | 384/50 |
| 7,350,270 B2 * | 4/2008 | Fournier | 16/91 |
| 2010/0206670 A1 * | 8/2010 | Schroeder et al. | 187/410 |

FOREIGN PATENT DOCUMENTS

| | | |
|---|---|---|
| EP | 0 274 682 A2 | 7/1988 |

* cited by examiner

LINEAR RAIL SYSTEM HAVING PRELOAD ADJUSTMENT MECHANISM

CROSS-REFERENCE TO RELATED PATENT APPLICATIONS

This patent application claims the benefit of U.S. Provisional Patent Application No. 61/054,324, filed May 19, 2008, the disclosure and teachings of which are incorporated herein, in their entireties, by reference.

FIELD OF THE INVENTION

The present invention generally relates to guide mechanisms and more particularly to guide mechanisms employing rollers which ride upon rails.

BACKGROUND OF THE INVENTION

Linear guide mechanisms, also known as linear guide systems, are used for literally thousands of applications. Some of the most basic applications are found in conventional furniture drawers wherein the linear guide mechanism is the mechanism upon which a drawer slides relative to the desk, countertop, or the like. In addition to such furniture applications, linear guide mechanisms are used in a number of industrial settings, particularly in conjunction with machine tools. Very often a machine bed will need to slide axially back and forth as the machine operation is performed.

With regard to the machine tool application, particularly, the linear guide mechanism may need to be manufactured to move along an axis with practically no play or deflection away from the axis of the linear slide. Any such play or movement would necessarily detrimentally affect the machining operation in that the machining operation is typically computer controlled, and any movement in the linear slide mechanism would therefore result in misalignment of the machine tool and the work piece.

With that background, attempts have been made to provide linear guide systems that include carriages or slide bodies that include guide wheels that can be adjustably positioned relative thereto to compensate for play or wear as well as to allow for broader tolerances during manufacture. More particularly, U.S. Pat. Nos. 6,149,308 and 6,450,687, both entitled "Linear Rail System Having Preload Adjustment Apparatus," and assigned to Pacific Bearing Company, the Assignee of the instant application, illustrate carriage bodies that have a plurality of guide rollers mounted thereto. At least one of the guide rollers is adjustable relative to the other guide rollers so as to allow mechanical adjustment of preloading of the rollers against a guide rail or to remove any play between the rollers and the corresponding guide rail. In these embodiments, the guide wheel or roller is mounted to an adjustment block that is linearly positioned relative to the slider or carriage body by linearly adjusting the position of a pair of set screw or other stop mechanism. The set screws are used to lock the position of the adjustment block relative to the carriage body once positioned in the desired location relative to the guide carriage.

U.S. Pat. Nos. 3,661,431 and 7,350,270 illustrate an additional means for providing adjustment of a guide wheel relative to a carriage or slider body. More particularly, these patents disclose a guide wheel assembly that includes a journal body that includes a mounting axis about which the journal body rotates as the guide wheel assembly is mounted to a carriage or slider body. The journal body also defines a guide wheel support axis about which the guide wheel rotates relative to the journal body. The guide wheel support axis and the mounting axis are parallel and offset from one another such that rotation of the journal body about the mounting axis will adjust the relative position of the guide wheel support axis. Thus, by rotating the journal body relative to the carriage body or slider block to which it is mounted the guide wheel can be adjusted to position it closer or farther from a guide rail.

The present invention relates to improvements over the current state of the art.

BRIEF SUMMARY OF THE INVENTION

The present invention has several aspects and features that may be claimed and stand as patentable independently and individually or in combination with other aspects and features, that may be implemented in the following embodiments. Embodiments of the invention provide a means for adjusting the position of a guide wheel relative to a carriage body by rotation of a support shaft relative to the carriage body. The support shaft may then be locked in position using a plurality of locking mechanisms provide counter-acting torques.

In a first embodiment, guide carriage assembly including a carriage body, first and second adjustment members and a support shaft is provided. The carriage body includes first and second adjustment bores extending along first and second axes in communication with a mounting bore extending along a third axis. The first and second axes are offset from and extend at non-zero angles to the third axis. The first adjustment member is adjustably received and secured in the first adjustment bore. The second adjustment member is adjustably received and secured in the second adjustment bore. The support shaft is received in the mounting bore. The support shaft includes a locating portion, a bearing portion and a head portion. The locating portion defines a locating axis about which the support shaft rotates within the mounting bore. The bearing portion defines a bearing axis, the bearing axis being parallel to and eccentrically offset from the locating axis. The head portion includes at least one cam surface. The at least one cam surface facing the first and second adjustment bores such that the first and second adjustment members can simultaneously abut the at least one cam surface and prevent rotation of the support shaft about the locating axis. It should be noted that if the at least one cam surface includes a plurality of cam surfaces, no single cam surface need be facing both the first and second adjustment bores and no single cam surface need be simultaneously abutted by both adjustment members. It is sufficient that a single cam surface face a single adjustment bore and be abutted by a single adjustment member.

In a preferred implementation, the third axis is substantially coaxial with the locating axis.

In a further preferred implementation, the at least one cam surface is comprised of at least first and second cam surfaces that extend at a first angle relative to one another and wherein the first and second axes extend at a non-zero second angle relative to one another. Further, the first cam surface faces the first adjustment bore and the second cam surface faces the second adjustment bore. Preferably, the first and second angles are 90 degrees. However, other angles may be implemented.

In an alternate embodiment, the at least one cam surface is comprised of at least first and second cam surfaces that are on opposite sides of the head portion and generally face away from one another and the first and second adjustment bores are on opposed sides of the head portion. In this arrangement, it is preferred, but not required to have the first and second axes be substantially co-axial and the first and second cam surfaces be substantial parallel to one another. As used here in, substantial may refer to a variation of about five percent. Further, it is preferred that the first and second cam surfaces are equally spaced from the locating axis.

To assist in mounting the support shaft, the mounting bore preferably extends entirely through the carriage body and includes a first portion having a first diameter and a second portion having a second diameter being larger than the first diameter. Similarly, the head portion of the support shaft is located in the second portion and the first and second adjustment bores in communication with the second portion. The head portion has a stepped profile to provide axial location of the support shaft within the mounting bore.

In a preferred embodiment, the support shaft takes the general form of a stepped profile stud shaft. The bearing portion has a first outer diameter. The locating portion has a second outer diameter being different than the first outer diameter. Further, the head portion may include an annular abutment flange having a third diameter. The third diameter being greater than the second diameter to provide an axial abutment to provide axial location of the stud shaft within the mounting bore.

Not all embodiments of the invention must use rolling elements but could rely strictly on sliding interaction of the support shaft, which may or may not include a low-friction layer of material and a corresponding guide rail or raceway. However, in a preferred embodiment, the guide carriage further comprises a wheel supported by the support shaft that rotates about the bearing portion and the bearing axis. The wheel and the support shaft forming, at least in part, an adjustable guide wheel having an adjustable position relative to the carriage body. Further, the guide carriage assembly may also include a fixed position guide wheel mounted to the carriage body. Rotation of the support shaft about the locating axis adjusts the distance between the fixed position guide wheel and the adjustable position guide wheel.

Further, the invention may be implemented solely as a support shaft. The support shaft includes a locating portion, a support portion and a head portion. The locating portion defines a locating axis. The support portion defines a bearing axis. The bearing axis is parallel to and eccentrically offset from the locating axis. The head portion includes at least two abutment portions offset from the locating axis. The at least two abutment portions form a lock portion.

In one preferred embodiment of the support shaft, the at least two abutment portions are formed by a single planar surface having a first portion offset from the locating axis in a first direction and a second portion offset from the locating axis in a second opposite direction. The first and second portions are on opposed sides of the locating axis.

In an alternative preferred embodiment, the at least two abutment portions are first and second cam surfaces that extend at a non-zero angle relative to one another. More preferably, the at least two abutment portions are first and second cam surfaces that face away from one another and are located on opposite sides of the locating axis.

In a further implementation of the invention, a mechanism for adjusting the position of a roller relative to a linear rail having first and second opposed raceways is provided. The mechanism comprises a carriage body, a support shaft, a wheel and means for locking the position of the support shaft relative to the carriage body. The support shaft is rotatably mounted to the carriage body for rotation about a location axis. The wheel is carried by the support shaft for rotation about a bearing axis defined by the support shaft. The bearing axis is offset from and parallel to the location axis. The means for locking the position of the bearing axis relative to the carriage body selectively applies opposing torques to the support shaft about the location axis. Preferably, the opposing torques of the locking means are exclusive of frictional forces and are provided by interference structures interfering with rotation of the support shaft in either direction about the location axis and thus not provided by threads.

The two opposing torques are unequal when adjusting the position of the first roller and are equal when the position of the first roller is fixed. Further, the locking means permits the relative position of the bearing axis to be infinitely angularly positioned between a first position and a second position angularly offset about the locating axis from the first position.

In a further implementation of the invention, a guide wheel assembly is provided. The guide wheel assembly includes a support shaft and a wheel mounted to the support shaft. The support shaft includes a locating axis, a support portion defining a bearing axis, the bearing axis being parallel to and eccentrically offset from the locating axis and a head portion including at least two abutment portions offset from the locating axis. The at least two abutment portions form a lock portion. The guide wheel is operably mounted to the support portion for rotation about the bearing axis.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
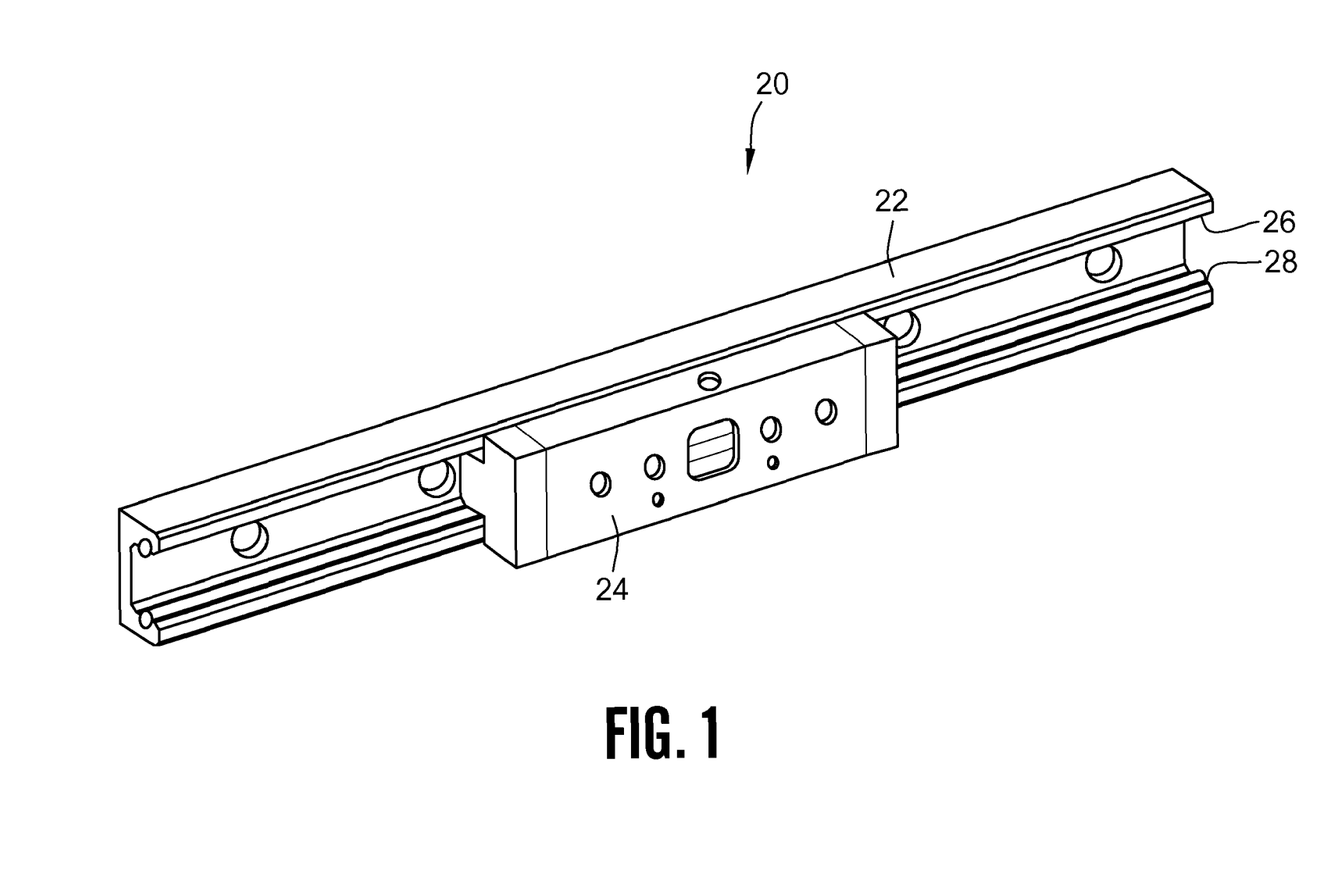
FIG. 1 is a perspective view of a representative implementation of the present invention.

Referring now to the drawings and with particular reference to FIG. 1, a representative form of the present invention is depicted as guide system 20 also referred to as a slide system or bearing system. As used herein, the term "slide" may refer to a device that includes rollers that roll along a rail and not merely two objects that slide relative to one another. As can be seen from FIG. 1, guide system 20 primarily consists of rail 22 and guide carriage 24 (also referred to simply as a "carriage") which is adapted to axially translate across rail 22. One of ordinary skill in the art will readily recognize that a pair of rails 22 is typically used in most applications and provided in opposing orientation. A platform or other article in need of linear movement can then be attached to the two slider bodies to allow for reciprocating movement.

However, in many applications, it is necessary that the article being moved back and forth across the rails 22 be moved in a perfect or substantially perfect plane or under perfect control along a predefined path with substantially no movement orthogonal to the rail. Because the rail 22 is comprised of an upper raceway 26 and parallel lower raceway 28 any departure of the raceways from a uniform distance therebetween, will result in undesirable orthogonal movement of the guide carriage 24. Even if the rail 22 is manufactured perfectly, over a period of time, the upper raceway 26 and lower raceway 28 can wear or deflect out of a perfect plane due to excessively high loads, shock loads, or thermal expansion. The present invention therefore provides a guide carriage 24 with a mechanism for ensuring contact of the rollers of the guide carriage with upper raceway 26 and lower raceway 28. While the illustrated embodiment utilizes a carriage 24 that utilizes rollers that ride between the upper and lower raceways 28, alternative embodiments can be configured such that the raceways are positioned between two sets of rollers, i.e. the rollers ride on "outer" raceways.

Figure 2:
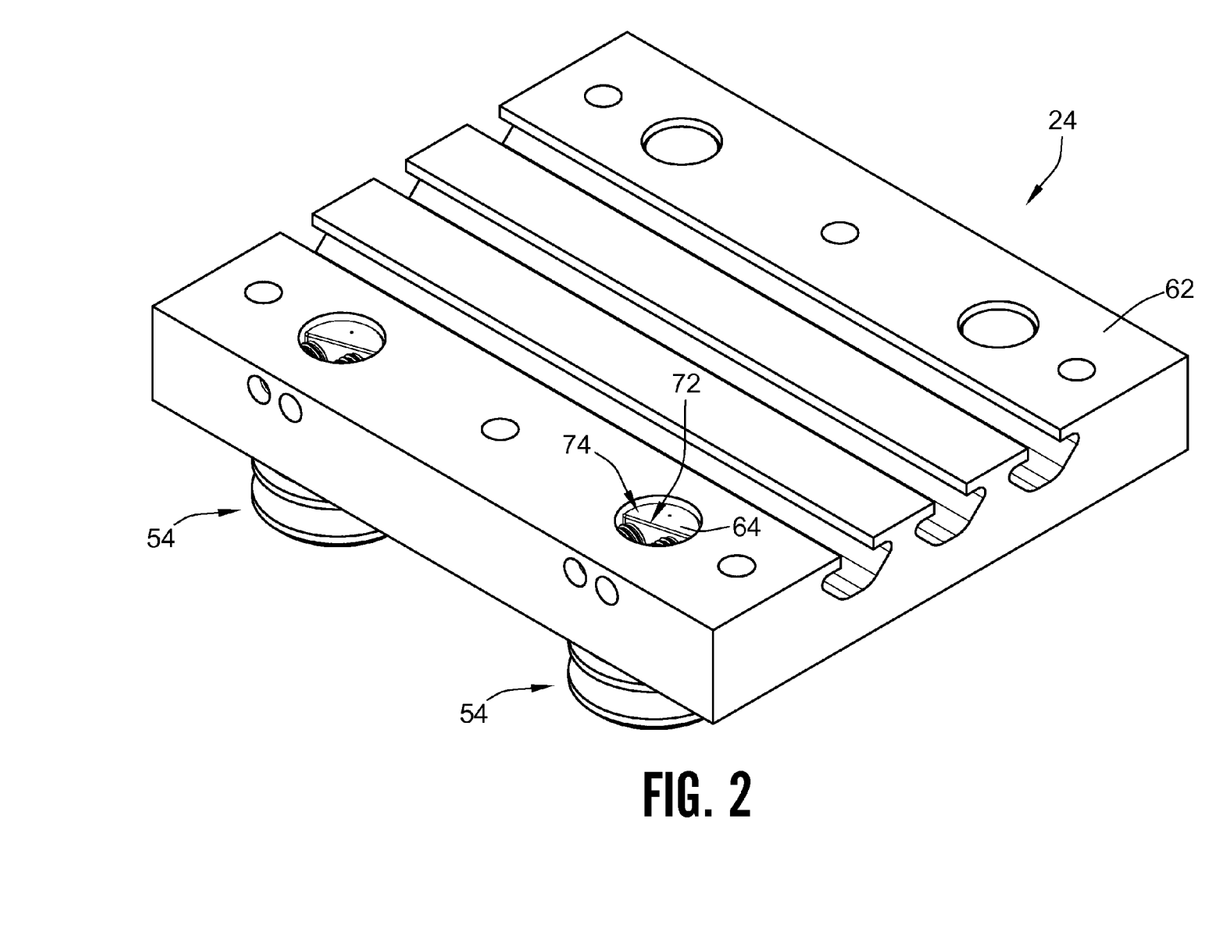
FIG. 2 is a top perspective illustration of a preferred embodiment of a guide carriage according to the teachings of the present invention.
Figure 3:
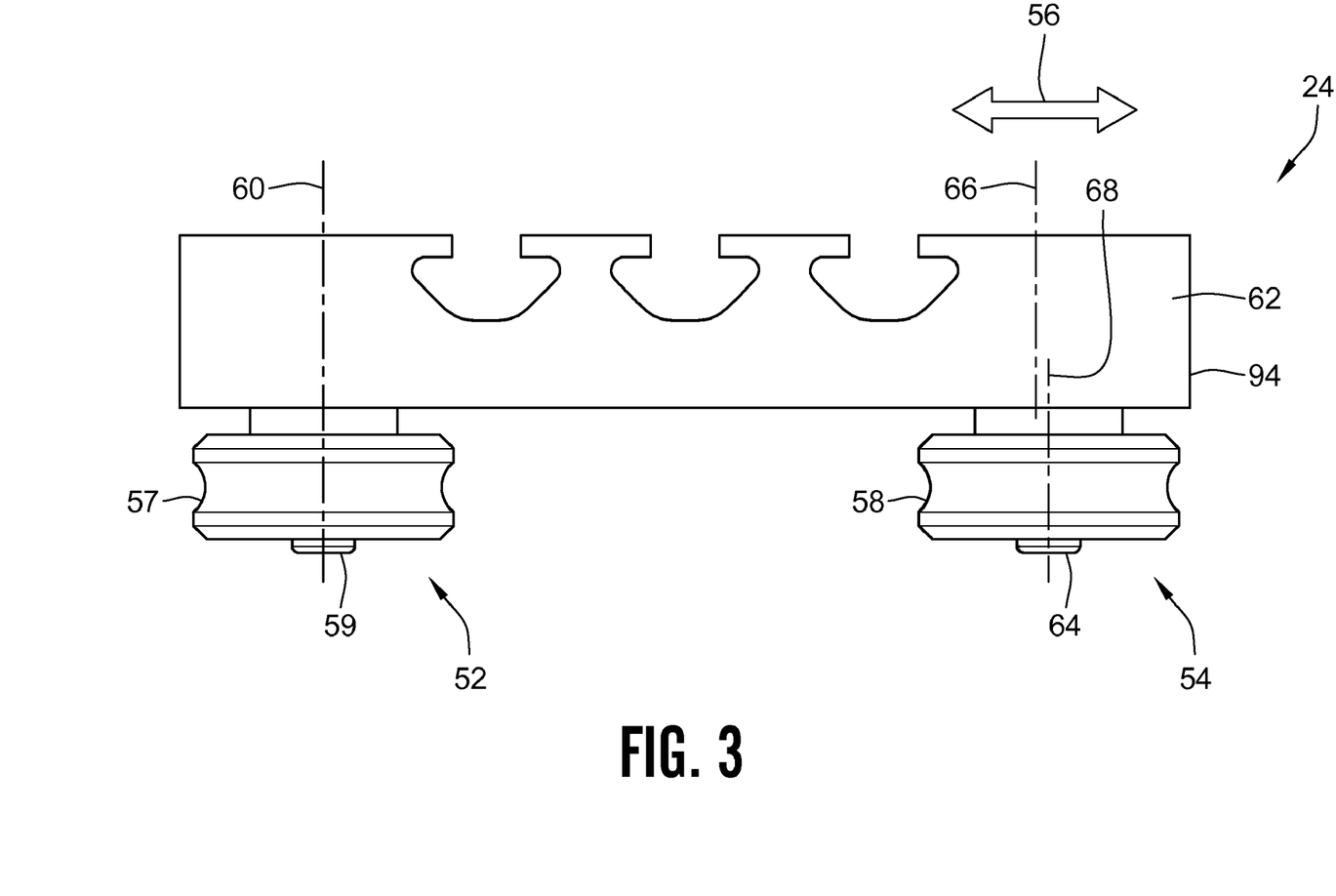
FIG. 3 is an end profile view of the guide carriage of FIG. 2.

FIGS. 2 and 3 illustrate a first embodiment of a carriage 24 that includes a plurality of guide roller assemblies 52, 54 (also referred to herein as "guide wheel assemblies"). Guide roller assemblies 54 are adjustable position guide roller assemblies. Guide roller assemblies 52 are fixed position guide roller assemblies. With specific reference to FIG. 3, guide roller assemblies 52 are aligned with one another and guide roller assemblies 54 are also aligned with one another such that only a single front-most guide roller assembly 54 and only a single front-most guide roller assembly 52 are visible in this view, with the other respective guide roller assemblies 52, 54 positioned directly behind their counterparts. (see also the alignment shown at FIG. 2). As such, reference to guide wheel assembly 52 in the singular is meant to include both guide wheel assemblies 52. Similarly, reference to guide wheel assembly 54 in the singular or plural is meant to include both guide wheel assemblies 54.

The adjustable guide roller assemblies 54 can be used to fine tune the adjustment of the carriage 24 relative to a guide rail such as guide rail 22 of FIG. 1. More particularly, the adjustable guide wheel assemblies 54 may be moved laterally left or right as illustrated in FIG. 3 as arrow 56 (such as closer or farther away from guide wheel assemblies 52) so as to adjust the mounting of the carriage 24 to a guide rail. By moving the adjustable guide wheel assemblies 54 relative to the guide wheel assemblies 52, the user can compensate for any play that may arise between guide wheels 57, 58 due to wear or deflection of upper and lower raceways 26, 28 or alternatively any wear in the wheels themselves. Further yet, in some arrangements, it is desired to have the guide wheels of the assembly in a pre-load arrangement, i.e. they are biased under load against the raceways of the rail. The adjustability of embodiments of the present invention permit the operator to adjust and set the desired preload.

While the description herein typically refers to "guide wheels" or "wheels", the terms "wheel" or "guide wheels" by themselves or in combination with other terms, i.e. "guide wheel assemblies", are meant to be broad enough to encompass other types of rotating structures such as, for example, rollers.

Guide wheel assemblies 52 are considered fixed position guide wheel assemblies because the guide wheel 57 is mounted to a support shaft in the form of stud shaft 59 that has a mounting axis 60 that is coaxial with an axis of rotation of the guide wheel 57 about the stud shaft 59. Thus, rotation of the stud shaft 59 about the mounting axis relative to the carriage body 62 does not adjust the relative position of the guide wheel 57 relative to the carriage body 62.

However, guide wheel assemblies 54 are adjustable guide wheel assemblies because this same configuration is not true. More particularly, support shafts in the form of stud shafts 64 of these wheel assemblies 54 define a mounting or locating axis 66 that is eccentrically offset from and not coaxial with a wheel support axis 68 (also referred to as a bearing axis) about which the guide wheel 58 rotates, as will be more fully described below. Thus, when the stud shaft 64 is rotated relative to the carriage body 62 about the locating axis 66, a bearing axis in the form of wheel support axis 68 in the illustrated embodiment is rotated about locating axis 66 to adjust the relative position of the guide wheel 58 relative to the carriage body 62.

It should be noted that the stud shafts of the features of the stud shafts of the illustrated embodiments could be implemented without supporting guide wheels in guide arrangements where the reduced friction provided by a rolling element is not desired. More particularly, the stud shaft could directly ride on the raceways 26, 28 of the rail 22. In these embodiments, the bearing axis becomes a point of reference for the portion of the shaft that rides on the raceways 26, 28 which provides an adjustable point of sliding contact between the stud shaft and the raceways 26, 28. In this arrangement, the support portion of the stud shaft, i.e. wheel support portion defined more fully below, would directly slidingly contact or include an outer layer that directly slidingly contacts rail 22 and particularly raceways 26, 28.

Figures 4, 5:
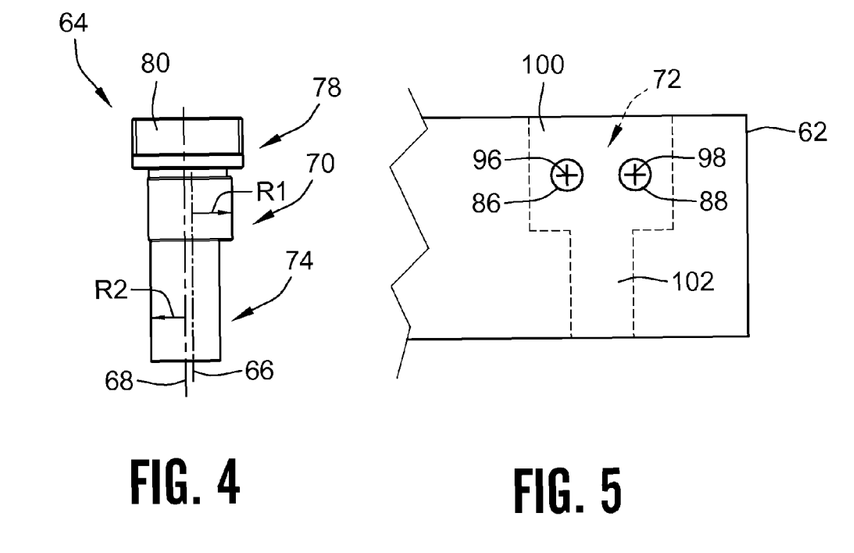
FIG. 4 is a side illustration of a stud shaft according to the present invention.
FIG. 5 is a simplified side profile illustration of the carriage body of FIG. 2.

With reference to FIG. 4, the stud shaft 64 of adjustable guide wheel assembly 54 includes a locating portion 70 (also referred to as a mounting portion) that is inserted into a locating cavity 72 formed in the carriage body 62 (See FIG. 5). The locating portion 70 defines the locating axis 66 about which the stud shaft 64 rotates relative to the carriage body 62. This locating portion 70, can also be referred to as a mounting portion of the stud shaft 64 as the locating portion may also be used to secure the stud shaft 64 to the carriage body 62 in the event that the locating portion also includes a threaded portion or other connection mechanism to rotatably secure the stud shaft 64 to the carriage body 62.

In one preferred embodiment, locating portion 70 is not threaded such that rotation of stud shaft 64 about locating axis 66 does not also result in axial movement along locating axis 66.

A wheel support portion 74 (also referred to as a bearing portion) of the stud shaft 64 is eccentrically offset from the locating portion 70. The wheel support portion 74 defines the wheel support axis 68 which forms an axis of rotation for a guide wheel 58 (see FIG. 3) that is mounted to the stud shaft 64. The wheel support portion 74 may take the form of an inner race upon which ball bearing interposed between a guide wheel and the wheel support portion 74 may ride. Alternatively, the wheel support portion 74 may directly support a guide wheel. Further yet, other support structures may be interposed between a guide wheel and the wheel support portion 74 such as bushings or external ball bearings that include their own inner and outer races that are independently formed from the guide wheel and the stud shaft 64. The wheel support portion 74 may be externally or internally threaded.

As the stud shaft 64 rotates about the locating axis 66, the wheel support axis 68 will rotate eccentrically about the locating axis 66 so as to adjust the position of the wheel support axis 68 relative to the carriage body 62.

Figure 8:
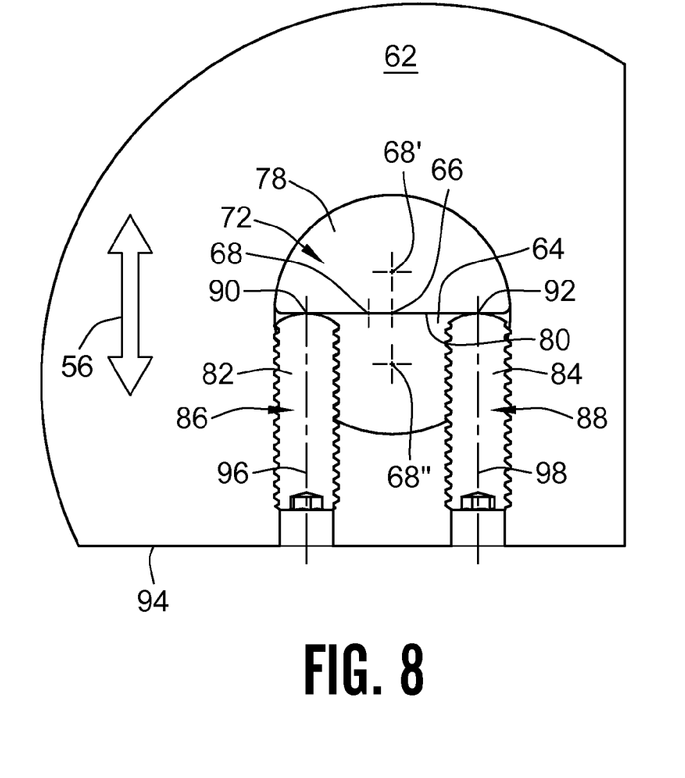
FIG. 8 is a partial top view illustration of the guide carriage of FIG. 2.

With further reference to FIGS. 4-8, the stud shaft 64 further includes a locking head portion 78, which includes a cam surface 80 that can be engaged by locking mechanisms, also referred to as adjustment mechanisms, to fix the angular relative position of the stud shaft 64 within the locating cavity 72 of the carriage body 62. With reference to FIG. 8, the locking head portion 78 of one of the adjustable guide wheel assemblies can be positioned within locating cavity 72 in the top of the carriage body 62. As illustrated, the cam surface 80 (forming a lock portion of the locking head portion 78) is engaged by a means for locking the position of the bearing axis 68 relative to the carriage body provided by a pair of locking mechanisms in the form of screws 82, 84. In a preferred embodiment, the means for locking the position of the bearing axis 68 relative to the carriage body are provided by the screws 82, 84 which are set screws such that the screws 82, 84 can be entirely recessed within adjustment bores 86, 88 that communicate with the locating cavity 72. However, alternative screws that include heads that stick out of the adjustment bores 86, 88 can be used in other embodiments. Further yet, adjustment mechanisms that are not screws but are merely retained in the adjustment bores 86, 88 by friction fit or other mechanisms can be employed.

The ends 90, 92 of the screws 82, 84 contact the cam surface 80 to lock the position of the stud shaft 64 relative to the carriage body 62. More particularly, by using two screws 82, 84, each screw prevents the stud shaft from rotating relative to the other screw 82, 84.

When adjusting the relative position of the wheel support axis 68, one of the screws 82, 84 can be used to define a relative angular position of the stud shaft 64 relative to the carriage body 62 and then the second screw 84, 82 can be used to lock the stud shaft 64 in the desired relative angular position. For instance, one screw 82 will be threaded into adjustment bore 86 such that end 90 is in a desired position and then the second screw 84 will be threaded in to adjustment bore 88 such that end 92 engages the cam surface 80 causing the stud shaft 64 to rotate about locating axis 66 until the cam surface 82 is pressed into the end 90 of first screw 82 thereby locking the angular position of the stud shaft 64. While the orientation of the stud shaft 64 is being adjusted, the torque applied to the stud shaft 64 by screw 84 is greater than the torque being applied by screw 82, which is effectively zero.

When the cam surface 80 is engaged by the two screws 82, 84 in the locked position, the torques applied by the two screws 82, 84 about the locating axis 66 are effectively equal. This fixes the orientation of the stud shaft 64 and particularly the orientation of the wheel support axis 68 relative to the carriage body 62.

After initially setting the position of the stud shaft 64 and the user desires to adjust the position of the wheel support axis 68 relative to the carriage body 62 so as to adjust slop between an attached guide wheel and a raceway 26, 28, the user will loosen the screw 82, 84 that is positioned in the desired rotational direction of head portion 78.

For example, with reference to FIG. 8, if the desired rotation of the stud shaft 64 is in the clockwise direction to properly adjust the position of the wheel support axis 68 relative to the carriage body 62, the operator will loosen screw 84 such that end 92 is in a new desired position to allow the stud shaft 64 to move in the clockwise direction. Next, the operator will then tighten screw 82 by threading the screw 82 further into adjustment bore 86 until the cam surface 80 again contacts the end 92 of screw 88. Thus, in this adjustment method, screw 84 acts as a positioning screw while screw 82 acts as a locking screw.

Alternatively, if it is necessary to rotate the stud shaft 64 in the counter-clockwise direction to properly adjust the position of the wheel support axis 68 relative to the carriage body 62, the operator would first loosen screw 82 by threading it away from and out of engagement with cam surface 80 a desired amount of adjustment. Then, the operator would thread set screw 84 into the carriage body 62 causing the stud shaft 64 to rotate about the locating axis 66 in the counter-clockwise direction until the cam surface 80 engaged the end 90 of set screw 82. In this adjustment method, screw 82 acts as a locating or adjustment screw and the other screw 84 acts as the locking screw.

In this embodiment, both screws 82, 84 are received through the same side 94 of the carriage body 62. Thus, both adjustment bores 86, 88 communicate with side 94 and the locating cavity 72. Further, the operator can access both screws 82, 84 via adjustment bores 86, 88 same side, side 94, when adjusting the position or orientation of the stud shaft 64.

The adjustment bores 86, 88 define adjustment bore axes 96, 98. These bore axes 96, 98 extend at a non-zero angle relative to locating axis 66 and are offset laterally from the locating axis 66 such that the force applied to the cam surface 80 provides the desired torques to adjust and lock the angular position of the stud shaft 64. In this embodiment, the adjustment bore axes 96, 98 are aligned parallel to one another.

Further yet, in this embodiment the plane defined by cam surface 80 includes the locating axis 66. The wheel support axis 68 is also included in the plane of the cam surface 80 such that the adjustment screws 82, 84 can provide symmetric loading as the position of the wheel support axis 68 is adjusted between two maximum adjustment positions identified by axis 68' and axis 68" to adjust the position back and forth (toward and away from side 94), as illustrated by arrow 56.

Figure 6:
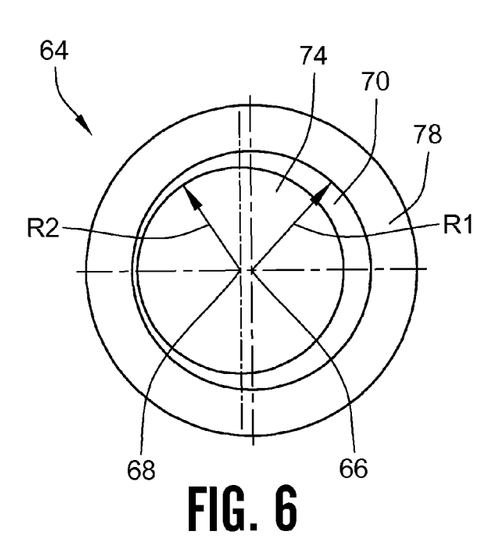
FIG. 6 is an end view illustration of the stud shaft of FIG. 4.
Figure 7:
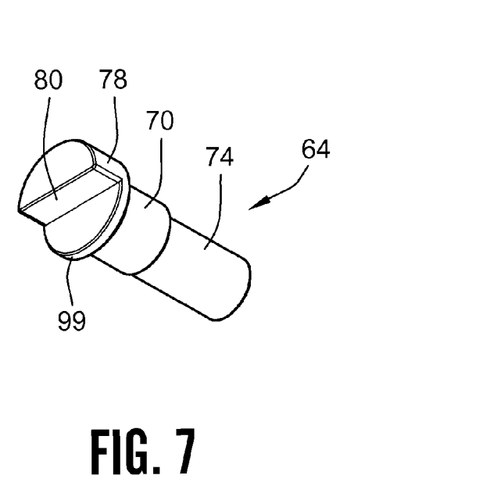
FIG. 7 is a perspective illustration of the stud shaft of FIG. 4.

With reference to FIGS. 4, 5 and 6, in the illustrated embodiment, the diameter of the locating portion 70 is greater than the diameter of the wheel support portion 74. The head portion 78 includes a flange portion 99 that has a larger diameter than the locating portion 70 defining a stepped profile. This stepped arrangement allows the head portion 78 to axially secure the stud shaft 64 within the locating cavity 72. Locating cavity 72 includes a counter bore portion 100 that is sized to the diameter of the flange portion 99 to receive head portion 78. As the head portion 78, and particularly cam surface 80 are located within the counter bore portion 100, the adjustment bores 86, 88 directly communicate with the counter bore portion 100 so as to permit the screws 82, 84 to engage cam surface 80.

The locating cavity 72 also includes a locating bore portion 102 that receives locating portion 70 of the stud shaft 64. The locating bore portion 102 and locating portion 70 are closely sized to prevent play therebetween.

Figure 9:
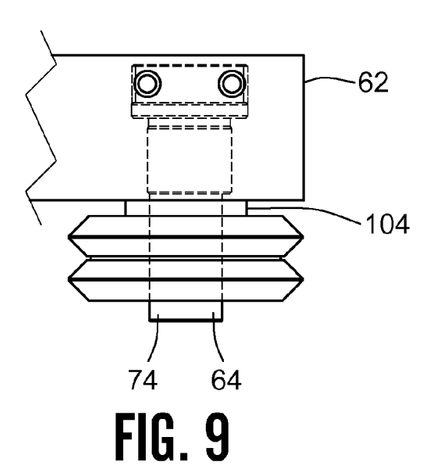
FIG. 9 is a partial side illustration of the guide carriage of FIG. 2.

A nut 104 or other locking device may be secured to the locating portion 70 or the wheel support portion 74 when the stud shaft is inserted through the locating cavity 72 to secure the two components to one another (see FIG. 9). Alternatively, the locating portion 70 may be directly threaded to the carriage body 64.

Figure 10:
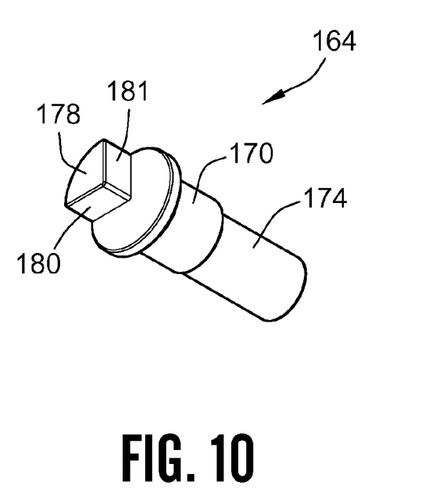
FIG. 10 is a perspective illustration of an alternative embodiment of a stud shaft according to the teachings of the present invention.
Figure 12:
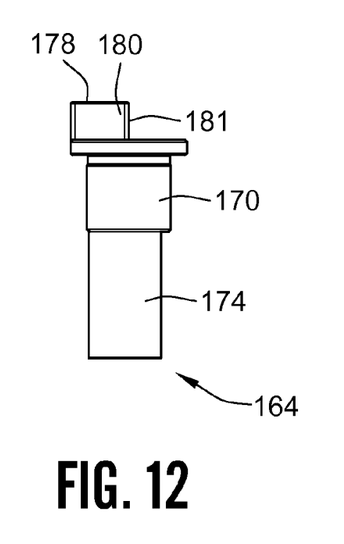
FIG. 12 is a side profile view of the stud shaft of FIG. 10.

An alternative embodiment of a stud shaft 164 according to the present invention is illustrated in FIGS. 10 and 12. Stud shaft 164 is similar to the previous embodiment in many respects. More particularly, stud shaft 164 includes a locating portion 170 axially interposed between a wheel support portion 174 and a locking head portion 178. Again, the locating portion 170 and wheel support portion 174 define an eccentrically offset locating axis and wheel support axis, respectively, such that rotation of the stud shaft 164 effectuates angular adjustment of the wheel support axis relative to a carriage body as previously described.

In this embodiment, the stud shaft 164 and more particularly the locking head portion 178 includes a pair of cam surfaces 180, 181. In this embodiment, the head portion 178 is generally pie-shaped such that the first and second cam surfaces 180, 181 extend relative to one another at a non-zero angle. In the illustrated embodiment, the cam surfaces 180, 181 extend at a right angle to one another. Thus, the pie-shape of head portion 178 is one-quarter of a circle. However, alternative arrangements can be implemented such that the angle between the two cam surfaces 180, 181 can be more than or less than 90 degrees.

Figure 11:
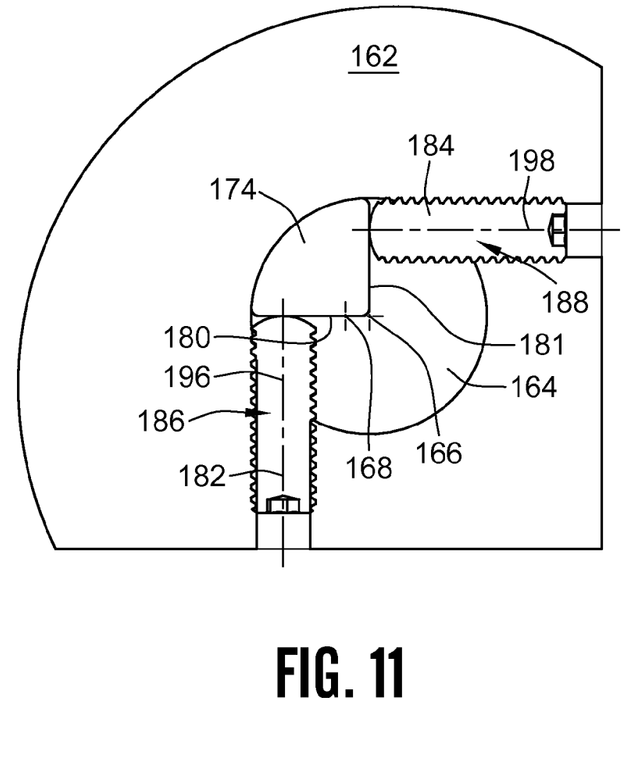
FIG. 11 is a partial top view illustration of an alternative guide carriage incorporating the stud shaft of FIG. 10.
Figure 13:
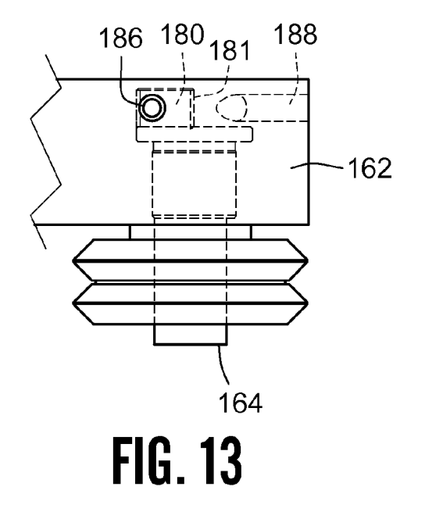
FIG. 13 is a partial side profile illustration of the guide carriage illustrated in FIG. 11.
Figure 15:
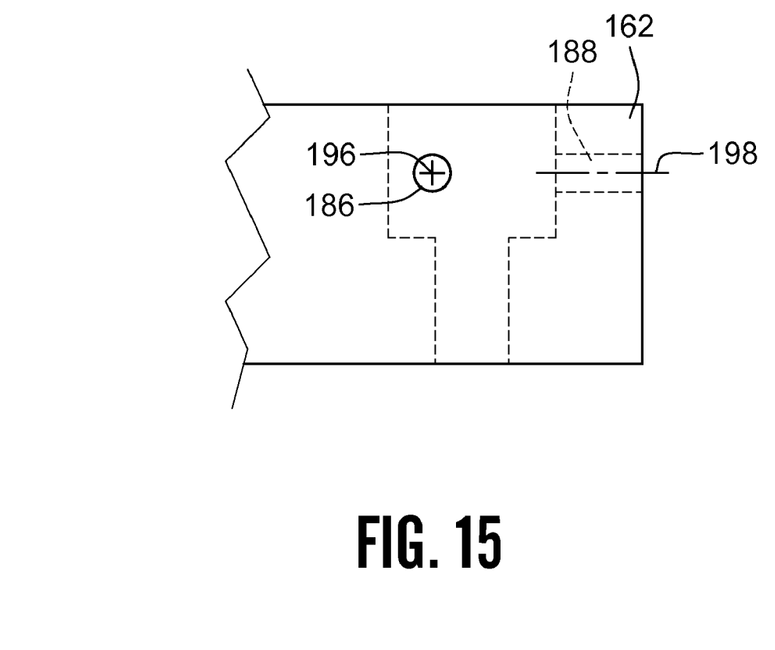
FIG. 15 is a side simplified illustration of the carriage body for the guide carriage of FIG. 11.

Cam surfaces 180, 181 interact with screws 182, 184 to adjust the orientation or relative position of the wheel support axis 168 relative to a carriage body 162 (See FIGS. 11, 13 and 15). However, unlike the previous embodiment, as the cam surfaces 180, 181 extend at an angle relative to one another, screws 182, 184 also are threaded into adjustment bores 186, 188 of the carriage body 162 that similarly extend at an angle relative to one another. More particularly, adjustment bores 186 and 188 extend at right angles relative to one another such that axis 196 defined by adjustment bore 186 may extend generally perpendicular to cam surface 180 while axis 198 defined by adjustment bore 188 is generally perpendicular to cam surface 181. Again axis 196, 198 extend at an angle to and are offset from locating axis 166 so as to permit applying a torque to the stud shaft about locating axis 166.

Figure 14:
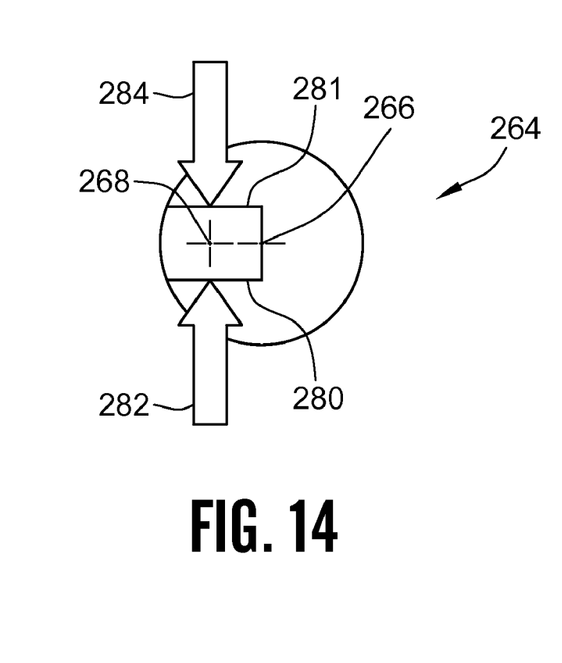
FIG. 14 is a top view illustration of an alternative stud shaft according to the teachings of the present invention.

A further embodiment is illustrated from a top view in FIG. 14. In this embodiment, cam surfaces 280, 281 are generally parallel to one another and offset to a same side of locating axis 266. Again, bearing axis 268 is offset from locating axis 255. Screws, illustrated as arrows 282, 284 can apply loading in a coaxial path to the two cam surfaces 280, 282. This permits a carriage body to be formed that requires adjustment bores that approach a locating cavity from opposite sides.

While other angles are permitted between two different cam surfaces, the use of the three identified arrangements are preferable because the adjustment screws may be arranged perpendicular to the sides of the carriage body.

By including the screws in the previous embodiments, the operator need not rely on friction between the stud shaft and the carriage body to prevent the stud shaft from rotating relative to the carriage body. The screws provide absolute stops to lock the position and orientation of the stud shafts.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A guide carriage assembly comprising:
  a carriage body including first and second adjustment bores extending along first and second axes in communication with a mounting bore extending along a third axis, the first and second axes offset from and extending at non-zero angles to the third axis; and
  a first adjustment member is adjustably received and secured in the first adjustment bore;
  a second adjustment member adjustably received and secured in the second adjustment bore;
  a support shaft received in the mounting bore, the support shaft including:
    a locating portion defining a locating axis about which the support shaft rotates within the mounting bore;
    a bearing portion defining a bearing axis, the bearing axis being parallel to and eccentrically offset from the locating axis; and
    a head portion including at least one cam surface, the at least one cam surface facing the first and second adjustment bores such that the first and second adjustment members can simultaneously abut the at least one cam surface and prevent rotation of the support shaft about the locating axis.

2. The guide carriage assembly of claim 1, wherein the third axis is substantially coaxial with the locating axis.

3. The guide carriage assembly of claim 1, wherein the at least one cam surface is comprised of at least first and second cam surfaces that extend at a first angle relative to one another and wherein the first and second axes extend at a non-zero second angle relative to one another; and wherein the first cam surface faces the first adjustment bore and the second cam surface faces the second adjustment bore.

4. The guide carriage assembly of claim 3, wherein the first and second angles are 90 degrees.

5. The guide carriage assembly of claim 4, wherein the support shaft includes at least one position within the mounting bore wherein the first axis is orthogonal to the first cam surface while the second axis is simultaneously orthogonal to the second cam surface.

6. The guide carriage assembly of claim 1, wherein the at least one cam surface is comprised of at least first and second cam surfaces that are on opposite sides of the head portion and face away from one another and the first and second adjustment bores are on opposed sides of the head portion.

7. The guide carriage assembly of claim 6, wherein the first and second axes are substantially co-axial and the first and second cam surfaces are substantially parallel to one another.

8. The guide carriage assembly of claim 7, wherein the first and second cam surfaces are equally spaced from the locating axis.

9. The guide carriage assembly of claim 1, wherein the first and second axes are laterally offset from one another on opposite sides of the third axis and are parallel to one another, but the first and second axes are on a same side as the locating portion, such that the first and second adjustment bores do not face one another.

10. The guide carriage assembly of claim 1, wherein the mounting bore extends entirely through the carriage body and includes a first portion having a first diameter and a second portion having a second diameter being larger than the first diameter, the head portion of the support shaft being located in the second portion and the first and second adjustment bores in communication with the second portion.

11. The guide carriage assembly of claim 1, wherein the bearing portion has a first outer diameter, the locating portion has a second outer diameter being different than the first outer diameter.

12. The guide carriage assembly of claim 11, wherein the head portion includes an annular abutment flange having a third diameter, the third diameter being greater than the second diameter.

13. The guide carriage assembly of claim 1, further comprising a wheel supported by the support shaft and rotating about the bearing portion and the bearing axis, the wheel and the support shaft forming, at least in part, an adjustable guide wheel having an adjustable position relative to the carriage body.

14. The guide carriage assembly of claim 13, further comprising a fixed position guide wheel mounted to the carriage body, wherein rotation of the support shaft about the locating axis adjust the distance between the fixed position guide wheel and the adjustable position guide wheel.

15. A mechanism for adjusting a position of a roller relative to a linear rail having first and second opposed raceways, the mechanism comprising:
  a carriage body;
  a support shaft rotatably mounted to the carriage body for rotation about a location axis;
  a wheel carried by the support shaft for rotation about a bearing axis defined by the support shaft, the bearing axis being offset from and parallel to the location axis; and
  means for locking the position of the bearing axis relative to the carriage body by selectively applying opposing torques to the support shaft about the location axis.

16. The mechanism of claim 15, wherein the opposing torques are unequal when adjusting the position of the roller and are equal when the position of the roller is fixed.

17. The mechanism of claim 15, wherein the locking means permits the relative position of the bearing axis to be infinitely angularly positioned between a first position and a second position angularly offset about the locating axis from the first position.

* * * * *